Jan. 12, 1943.   C. SAURER   2,308,311
MOTOR MOUNTING
Filed Nov. 26, 1940

INVENTOR
CURT SAURER
BY
ATTORNEYS

Patented Jan. 12, 1943

2,308,311

UNITED STATES PATENT OFFICE 2,308,311

MOTOR MOUNTING

Curt Saurer, Akron, Ohio

Application November 26, 1940, Serial No. 367,174

5 Claims. (Cl. 248—7)

This invention relates to motor mountings such as are used to support the motors of motor vehicles, and more especially it relates to resilient motor supports that comprise resilient material as a means for damping motor vibration and impeding translation thereof to the frame and body of the vehicle.

A vehicle motor of the internal combustion type operating in a moving vehicle sets up numerous vibrations, such as torque reaction that is parallel to the axis of the motor, vertical and horizontal vibrations due to bound and rebound of the vehicle, and a gyratory vibration arising from the rotation of the crank shaft of the motor. The said gyratory movement has an axis that is substantially parallel to the centerline of the crank shaft and is located two or three inches above the same, between said crank shaft and the center of gravity of the motor.

It will be obvious that every part of the vehicle motor is subject to gyratory movement, the extent of which varies in different parts of the motor due especially to pendulum action of the motor. Accordingly, the term "axis of gyration" as used herein is intended to designate the imaginary line or axis about which the orbit of gyration is of smallest extent. The location of said axis is the result of several factors, including the height of the motor, the location of center of its mass, the gyratory action of the crank shaft, and the location of fly wheel or wheels, but its location generally is from two to three inches above the crank shaft, depending upon the particular motor. Said axis of gyration is substantially parallel to the centerline of the crank shaft, and will not deviate more than 3 degrees therefrom as the result of fly wheel, gear case, and other heavy members that may be located at one end of the motor.

Numerous resilient motor supports have been devised for the purpose of damping motor vibration, among which may be mentioned those that support the motor on an axis that extends through its center of gravity, and those that support the motor on an axis that extends through the axis of the crank shaft. Such supports however have not been entirely successful in accomplishing the result for which they were designed, experience having shown that motor supports determinately positioned with relation to the axis of gyratory movement set up by the crank shaft to be superior in their function of insulating the vehicle frame against gyratory vibration of the motor. However, it is not possible to suspend a motor of present day design on this hypothetical center of gyration, and it is to the solution of this problem that this invention primarily is directed.

The chief objects of the invention are to improve the riding qualities of motor vehicles and to contribute to the comfort of the passengers thereof; and to improve the mechanical qualities of motor vehicles and reduce maintenance costs thereof by reducing the amount of engine vibration transmitter to the frames and bodies thereof. More specifically the invention aims to provide a motor support so constructed and arranged as to enable the motor to vibrate in its normal orbit about the aforesaid axis of gyration. Other objects will be manifest as the description proceeds.

The invention as shown is arranged for the support of the rear end of a vehicle motor, and is especially adapted for use in conjunction with resilient motor mountings such as constitute the subject matter of my co-pending application for Letters Patent, Serial 367,173, filed concurrently herewith, which mountings support the front end of the vehicle motor.

Figure 1:
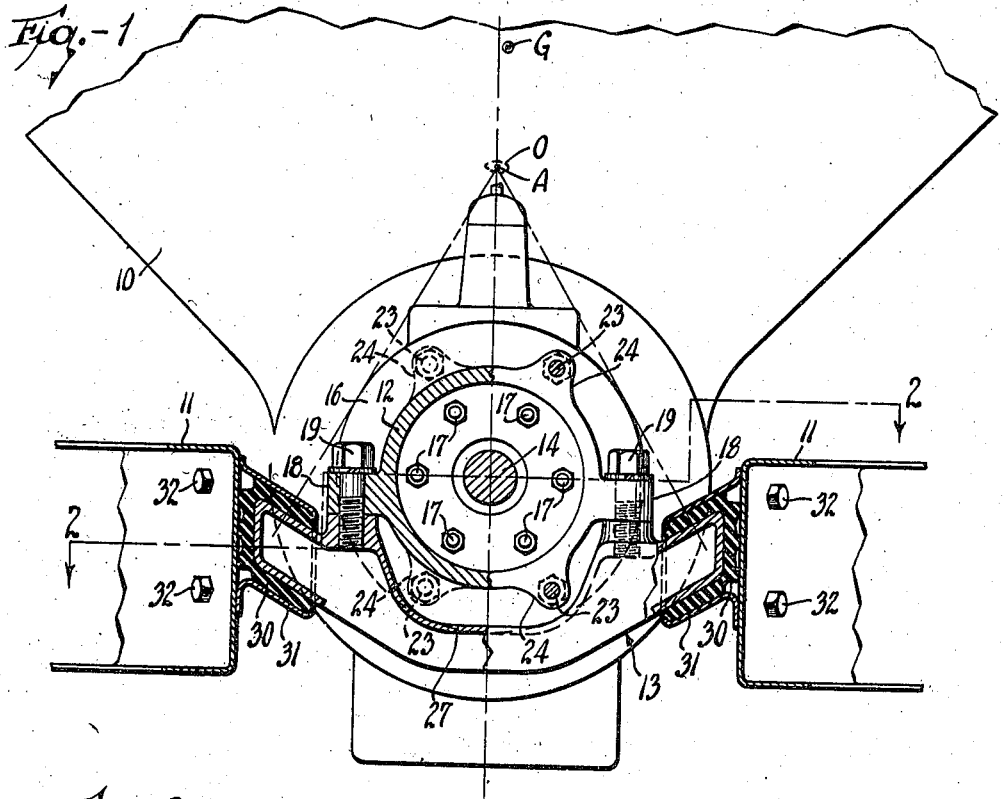
Figure 1 is a rear elevation of a V-type vehicle motor, and the improved motor mounting supporting the same, said mounting being in section on the line 1—1 of Fig. 2.

Referring to the drawing, there is shown a vehicle motor 10 of the V-type, transverse members 11, 11 of an X-type vehicle frame, an annular adapter or coupling 12 secured to the gear case of the motor 10, and the improved resilient motor mounting, designated as a whole by the numeral 13, which mounting is operatively interposed between the motor and frame of the vehicle by being connected to the frame members 11 and to the coupling 12. Indicated on the motor 10 is its center of gravity G, the same being in the position it assumes when the motor is idling, that is, operating at a speed of 8 miles an hour or less. Also indicated on the motor 10 is the axis A about which the motor gyrates when operating at driving speeds of from 20 to 60 miles an hour, and shown by the broken line O about the axis A is the orbit of gyration of the motor under impetus of the rotating crank shaft which is designated 14, said orbit being elliptical in shape.

The adapter or coupling 12 by means of which the motor is connected to the resilient mounting 13 is an annular structure that is angular in transverse section, and is secured to the gear case 16 of the motor, concentrically of the crank shaft 14 thereof, by means of a series of bolts 17, 17. The coupling 12 is integrally formed with a pair of ears 18, 18 that project laterally from opposite sides thereof and rest upon a member of the resilient mounting 13, said ears being apertured to receive respective cap screws 19 by means of which the coupling is secured to said mounting. Mounted upon the rear face of the coupling 12 are a pair of plates 20, 21 having axially apertured concavo-convex portions that are disposed concentrically of the axis of crank shaft 14, said concavo-convex portions being axially spaced apart from each other to receive the complementally shaped end portion of a tubular member 22 that encloses the rearwardly extending portion (not shown) of the crank shaft 14. The arrangement is such that member 22 has limited universal movement with relation to the plates 20, 21. The plates 20, 21 are secured to the coupling 12 by means of bolts 23, 23 that extend through marginal flanges on said plates and through apertured lugs 24 that project radially from the perimeter of the coupling.

Figure 2:
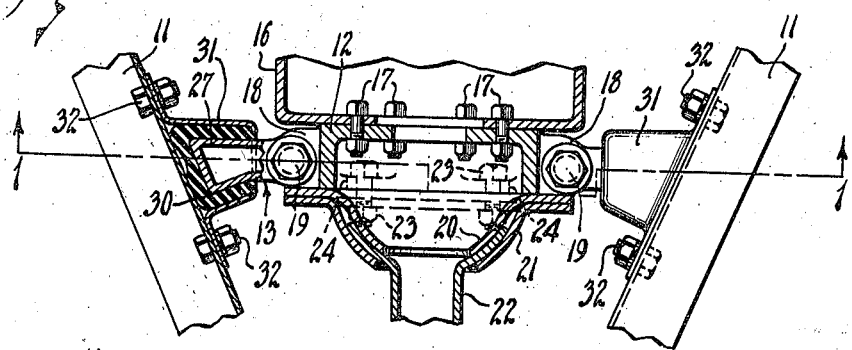
Figure 2 is a sectional view of the motor mounting on the line 2—2 of Fig. 1.

The resilient mounting 13 comprises a cradle-like supporting beam 27 upon which the coupling 12 rests, which beam is supported from its respective ends by the transverse members 11 of the vehicle frame through the agency of resilient elements presently to be described. In transverse section the beam 27 may be of inverted U-shape to provide lightness and strength. The beam extends transversely of the axis of crank shaft 14 of the motor, and is downwardly bowed from its respective ends toward its middle. The end portions of the beam 27, which are engaged by the resilient elements presently to be described, are obliquely disposed with relation to the horizontal, and have flat, parallel, upper and lower faces that are disposed perpendicular to respective radii that have a common center at the axis of gyration A of the motor, and which intersect upper and lower faces of said end portions in the medial regions thereof. The end faces of said end portions of the beam are vertically disposed, and are oblique with relation to the fore and aft axis of the motor so as to be disposed parallel to the adjacent faces of the transverse members 11 of the vehicle frame. The front and rear faces of the end portions of beam 27 may be in non-parallel relation to each other, as shown in Fig. 2, so that one of said faces at each end of the beam may be disposed perpendicular to the adjacent transverse frame member 11.

The resilient elements of the motor mounting comprise unitary bodies of resilient rubber composition 30 that embrace the four lateral faces and the end face of each end portion of the beam 27. The rubber bodies 30 are enclosed in respective casings 31 that are secured to respective frame members 11 by bolts 32, the outside dimensions of the rubber bodies 30 being somewhat greater than the inside dimensions of the casings 31 so that the rubber bodies are under normal compressive stress. The walls of the rubber bodies 30 are substantially of uniform thickness throughout so as to afford uniform yielding resistance to all vibration emanating from the motor 10. The walls of the rubber bodies 30, especially the walls between the end faces of the beam 27 and the frame members 11, may be formed with voids or recesses as shown to enable deformation or displacement of the rubber under the stresses to which it is subjected during use.

From the foregoing it will be apparent that the rubber bodies 30 are so constructed and arranged as yieldingly to resist relative movement between the motor and the frame of the vehicle in any and all directions. Because the top and bottom faces of the end portions of the beam 27 are disposed perpendicular to respective radii extending from the axis of gyration A of the motor 10, the latter is enabled to gyrate in its normal orbit O about the axis A, in opposition to the resistance to compression of the rubber bodies 30, the latter affording uniform resistance to said gyratory movement of the motor in all parts of the orbit of gyration. The arrangement is such that little if any vibration caused by gyratory movement of the motor is transmitted to the frame and body of the vehicle, and the other advantages set out in the foregoing statement of objects are achieved.

Figure 3:
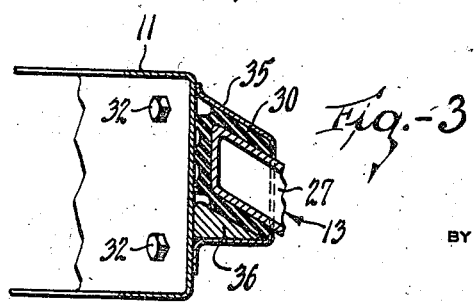
Figure 3 is a fragmentary section of a somewhat modified construction of motor mounting.

In the embodiment of the invention just described, the shape and arrangement of the lateral walls of each casing 31 is the same as the lateral faces of the rubber bodies 30. In Fig. 3 however, is shown a modified casing 35 of which the bottom wall is horizontally disposed and is perpendicular to the adjacent face of the frame member 11. Since the bottom face of the rubber body 30 is downwardly inclined toward the vertical plane of the motor, there is a wedge-shaped space between the rubber body 30 and the casing 35, which space is occupied by a rigid member 36 of wedge shape. The latter functions to put the rubber body 30 under compressive stress when the casing 35 is drawn up tightly against the frame member 11. The modified construction of the casing 35 simplifies the procedure of manufacturing the same.

Other modification may be resorted to without departing from the spirit of the invention, or the scope thereof as defined by the appended claims.

What is claimed is:

1. The combination which comprises an internal combustion motor, a supporting frame at opposite sides of said motor, a beam upon which the motor rests disposed below the motor and having its ends disposed adjacent said supporting frame, and resilient mountings embracing the respective end portions of said beam and secured to said supporting frame, the portions of the beam that are embraced by said mountings being disposed perpendicular at their medial region to radii emanating from the axis of minimum gyration of the motor.

2. A combination as defined in claim 1 in which the resilient mountings comprise respective bodies of rubber that are of uniform thickness over the several faces of the beam-ends.

3. The combination which comprises an internal combustion motor, a supporting frame at opposite sides thereof, a beam upon which the motor rests disposed below the motor and having its ends disposed adjacent said supporting frame with its end faces confronting lateral faces of the latter and parallel thereto, respective bodies of resilient rubber composition of uniform thickness covering the end portions of the beam, and respective metal casings secured to the supporting frame and embracing said rubber bodies, some of the faces of the end portions of the beam being so positioned that perpendiculars thereto meet at the axis of minimum gyration of the motor.

4. A combination as defined in claim 3 wherein each of the metal casings is of smaller inside dimensions than the outside dimensions of the rubber body it embraces so as to place the latter under compressive stress.

5. A combination as defined in claim 3 wherein each of the metal casings is spaced from a rubber body on one side of the latter, and including a wedge-like member between said casing and rubber body adapted to apply compressive stress to the rubber body when the casing is fully secured to the supporting frame.

CURT SAURER.